US008204767B2

(12) United States Patent
Dellinger et al.

(10) Patent No.: US 8,204,767 B2
(45) Date of Patent: Jun. 19, 2012

(54) METHOD AND APPARATUS FOR PROVIDING RETIREMENT INCOME BENEFITS

(75) Inventors: Jeffrey K. Dellinger, Fort Wayne, IN (US); Stephen H. Lewis, Fort Wayne, IN (US); Denis G. Schwartz, Fort Wayne, IN (US); Jason H. Rickard, Fort Wayne, IN (US)

(73) Assignee: Lincoln National Life Insurance Company, Fort Wayne, IN (US)

( * ) Notice: Subject to any disclaimer, the term of this patent is extended or adjusted under 35 U.S.C. 154(b) by 856 days.

(21) Appl. No.: 11/520,411

(22) Filed: Sep. 13, 2006

(65) Prior Publication Data

US 2007/0011086 A1    Jan. 11, 2007

Related U.S. Application Data

(60) Division of application No. 09/804,667, filed on Mar. 12, 2001, now Pat. No. 7,376,608, which is a continuation-in-part of application No. 09/406,290, filed on Sep. 24, 1999, now Pat. No. 7,089,201.

(60) Provisional application No. 60/101,883, filed on Sep. 25, 1998, provisional application No. 60/115,570, filed on Jan. 12, 1999.

(51) Int. Cl.
*G06Q 40/00* (2006.01)
(52) U.S. Cl. ........................................................... 705/4
(58) Field of Classification Search .................... 705/35, 705/36, 4
See application file for complete search history.

(56) References Cited

U.S. PATENT DOCUMENTS

| | | | |
|---|---|---|---|
| 4,055,757 | A | 10/1977 | Tillman et al. |
| 4,742,457 | A | 5/1988 | Leon et al. |
| 5,291,398 | A | 3/1994 | Hagan |
| 5,631,828 | A | 5/1997 | Hagan |
| 5,644,727 | A | 7/1997 | Atkins |
| 5,704,045 | A | 12/1997 | King et al. |
| 5,752,236 | A | 5/1998 | Sexton et al. |
| 5,754,980 | A | 5/1998 | Anderson et al. |
| 5,761,441 | A | 6/1998 | Bennett |

(Continued)

FOREIGN PATENT DOCUMENTS

GB 993766 2/1999

OTHER PUBLICATIONS

A. Mody, D. Patro, Methods of Loan Guarantee Valuation and Accounting, 1995, Sitesources.worldbank.org, pp. 4-5 and 8-9.*

(Continued)

*Primary Examiner* — Eric T Wong
(74) *Attorney, Agent, or Firm* — Barnes & Thornburg LLP

(57) ABSTRACT

A computerized method of administering a benefit plan providing systematic withdrawal payments during a liquidity period and annuity payments when the systematic withdrawal payments cease. The method includes steps of storing data relating to the plan, and performing a sequence of steps during the liquidity period to determine an account value, and initial and current benefit payments. The method further includes the steps of determining the account value to be annuitized at the end of the liquidity period, and determining and paying initial and current annuity payments during the annuity period. The method may be used when the benefit plan is a straight life annuity benefit plan, or a life annuity benefit plan having either a death benefit, a surrender benefit, or both.

17 Claims, 9 Drawing Sheets

| Contract Year | Net Inv. Return | Contract Value Variable Contract | Fixed Contract |
|---|---|---|---|
| 0 | - | 10,000 | 10,000 |
| 1 | 10% | 11,000 | 10,500 |
| 2 | 5% | 11,550 | 11,025 |
| 3 | -12% | 10,164 | 11,576 |
| 4 | 25% | 12,705 | 12,155 |
| 5 | 14% | 14,484 | 12,763 |
| 6 | 11% | 16,077 | 13,401 |
| 7 | 2% | 16,398 | 14,071 |
| 8 | -5% | 15,579 | 14,775 |
| 9 | 4% | 16,202 | 15,513 |
| 10 | 23% | 19,928 | 16,289 |
| 11 | 18% | 23,515 | 17,103 |
| 12 | 0% | 23,515 | 17,959 |
| 13 | -7% | 21,869 | 18,856 |
| 14 | -3% | 21,213 | 19,799 |
| 15 | 10% | 23,334 | 20,789 |

U.S. PATENT DOCUMENTS

| | | | |
|---|---|---|---|
| 5,839,118 | A | 11/1998 | Ryan et al. |
| 5,864,828 | A | 1/1999 | Atkins |
| 5,893,071 | A | 4/1999 | Cooperstein |
| 5,926,792 | A | 7/1999 | Koppes et al. |
| 5,930,760 | A | 7/1999 | Anderton |
| 5,933,815 | A * | 8/1999 | Golden ................... 705/36 R |
| 5,940,810 | A | 8/1999 | Traub et al. |
| 6,058,377 | A | 5/2000 | Traub et al. |
| 6,061,661 | A | 5/2000 | Hagan |
| 6,064,969 | A | 5/2000 | Haskins |
| 6,064,983 | A | 5/2000 | Koehler |
| 6,064,986 | A | 5/2000 | Edelman |
| 6,076,072 | A | 6/2000 | Libman |
| 6,085,174 | A | 7/2000 | Edelman |
| 6,105,865 | A | 8/2000 | Hardesty |
| 6,148,293 | A | 11/2000 | King |
| 6,253,192 | B1 | 6/2001 | Corlett et al. |
| 6,275,807 | B1 | 8/2001 | Schirripa |
| 2001/0014873 | A1* | 8/2001 | Henderson et al. ............. 705/35 |

OTHER PUBLICATIONS

Fortis Benefits Insurance Company, "Variable Account D of Union Security Insurance Co., Form N-4," filed with the SEC on Jun. 1, 1999.

*PFL Life Insurance Company, Guaranteed Minimum Income Benefit Rider*, filed with the Iowa Insurance Division as of Aug. 4, 1998.

*Endeavor Platinum Variable Annuity* filed with the SEC as of Apr. 29, 1998.

*Life of Virginia Joint Annuitant Single Premium Cash Refund Immediate Annuity: Form P1707*, approved by Florida Commissioner of Insurance and Treasurer on Mar. 12, 1991.

*The Minnesota Mutual Life Insurance Company: Minnesota Mutual Variable Annuity Account*, Form N-4 Registration Statement, filed with the SEC on Apr. 29, 1996.

Minnesota Mutual together with Minnesota Mutual Specimen Contract, approved by Texas Deputy Insurance Commissioner Jun. 5, 1996.

"Next VA Wave: Guaranteed Living Benefits"; Jul. 13, 1998.

"Widespread Annuitization Lies Ahead"; Aug. 10, 1998.

T. Rowe Price Variable Annuity Account, Form 485BPOS; Apr. 23, 1999.

"New Immediate VAs Put a Floor Under the Payout"; Jun. 28, 1999.

Minnesota Mutual Variable Annuity Account, Form 497; Jun. 13, 1996.

Minnesota Mutual Adjustable Income Annuity Brochure 000017046; Nov. 1997.

Minnesota Mutual Adjustable Income Annuity Brochure 000017054; Apr. 1999.

Minnesota Mutual Adjustable Income Annuity Disclosure 000017072; Apr. 21, 1998.

Minnesota Mutual Adjustable Income Annuity Illustration 00017084; Mar. 3, 1996.

"A New Twist in the Variable Annuity Market"; Mar. 1998.

John Hancock Life Insurance Co. (USA) Separate Account H; Form 497; May 5, 1998.

Fortis Income Preferred Prospectus; Sep. 1, 1999.

Manulife (John Hancock) Variable Annuity Contract; Apr. 29, 1998.

*Tillinghast-Towers Perrin*; "The Variable Immediate Annuity Marketplace"; handout dated Aug. 25, 1998.

Rotello, Patricia A. "Developing an integrated retirement plan strategy, or does the shoe still fit?" Benefits Quarterly v9n4 pp. 61-65 Fourth Quarter 1993.

AnnuiSHARE™ Consumer Brochure, Version 1.20, Apr. 6, 1999; Cover: *AnnuiSHARE™ Lifetime Income Annuity; SHAREways to an enhanced and secure future in retirement*; (see inside cover, pp. 3-6, inside back cover and back cover).

*The Mechanics of Variable Annuitization*; by Jeffrey K. Dellinger, FSA, MAAA; Sep. 1994; Published in VARDS "Executive Series."

Internal Revenue Service Private Letter Ruling 9237030, Jun. 16, 1992 [Code Sec. 72].

Sutherland, Asbill, & Brennan, LLP, p. 4 of an article discussing Minnesota Mutual Life Insurance Company's Guaranteed Minimum Annuity Payment Amount. (undated).

Memorandum from Ron Ziegler RE: Minnesota Mutual's Adjustable Income Annuity/Product Idea, Jan. 14, 1997.

Kerry Geurkink, "Creativity in the Annuity Payout Phase" (PowerPoint Presentation), Jun. 11, 1998.

Deanne Osgood, "Industry Research: VA Guaranteed Living Benefits" (PowerPoint Presentation) Jun. 11-12, 1998.

Tillinghast-Towers Perrin, "The Variable Immediate Annuity Marketplace;" handout dated Aug. 25, 1998.

PR Newswire Online Article, "Fortis First to Market With an Unmatched Income Benefit," Sep. 28, 1999, found at: www.prnewswire.com.

*Golden American Life Insurance Co., Separate Account B of ING USA Annuity Life Insurance Co.*, Form 485APOS, filed with the SEC on Dec. 3, 1999.

PFL Life Endeavor Variable Annuity Prospectus; May 1, 1998.

PFL Life Endeavor Variable Annuity Prospectus with Family Income Protector Rider Supplement; Dec. 18, 1998.

PFL Life Endeavor Platinum Variable Annuity Prospectus; May 1, 1998.

PFL Life Endeavor Platinum Variable Annuity Prospectus with Family Income Protector Rider Supplement; Dec. 18, 1998.

Endeavor Sales Idea Brochure; (undated).

AXA Equitable Life Insurance Co., Form POS AM; Aug. 31, 1995.

AXA Equitable Life Insurance Co., Form POS AM; Aug. 29, 1996.

AXA Equitable Specimen Contract; Oct. 1995.

AXA Equitable MM1; Mar. 19, 1996.

AXA Equitable MM2; Feb. 8, 1996.

AXA Equitable MM3; Apr. 5, 1996.

"Equitable Puts Liquidity in Its New Immediate Annuity"; May 29, 1995.

* cited by examiner

| Withdrawal Number | Account Value BOY | Withdrawal Amount | Investment Return | Account Value EOY |
|---|---|---|---|---|
| 1 | $100,000.00 | $7,500.00 | 12% | $103,600.00 |
| 2 | $103,600.00 | $7,770.00 | 16% | $111,162.80 |
| 3 | $111,162.80 | $8,337.21 | 12% | $115,164.66 |
| 4 | $115,164.66 | $8,637.35 | -5% | $101,200.95 |
| 5 | $101,200.95 | $8,637.35 | -10% | $83,307.24 |
| 6 | $83,307.24 | $8,637.35 | -21% | $58,989.21 |
| 7 | $58,989.21 | $8,637.35 | 5% | $52,869.45 |
| 8 | $52,869.45 | $8,637.35 | -14% | $38,039.61 |
| 9 | $38,039.61 | $8,637.35 | 1% | $29,696.28 |
| 10 | $29,696.28 | $8,637.35 | -15% | $17,900.09 |
| 11 | $17,900.09 | $8,637.35 | -5% | $8,799.61 |
| 12 | $8,799.61 | $8,637.35 | 15% | $186.60 |
| 13 | $186.60 | $8,637.35 | 23% | $0.00 |
| 14 | $0.00 | $8,637.35 | 10% | $0.00 |
| 15 | $0.00 | $8,637.35 | 8% | $0.00 |

METHOD AND APPARATUS FOR PROVIDING RETIREMENT INCOME BENEFITS

RELATED APPLICATIONS

This application is a divisional application of U.S. patent application Ser. No. 09/804,667 filed Mar. 12, 2001 now U.S. Pat. No. 7,376,608, which application is a Continuation-in-Part of U.S. patent application Ser. No. 09/406,290 filed on Sep. 24, 1999 now U.S. Pat. No. 7,089,201, which application is based upon United States Provisional Applications: Ser. No. 60/101,883 filed on Sep. 25, 1998; and Ser. No. 60/115,570, filed on Jan. 12, 1999, the complete disclosures of all of which are hereby expressly incorporated herein by these references thereto.

FIELD OF THE INVENTION

The present invention relates to financial services and products. More particularly, the present invention relates to a method and system for administering retirement income benefits. The invention further relates to a data processing method and system for the efficient administration of benefits paid from fixed or variable annuity products, including provisions for guarantees related to retirement income derived from and death benefits associated with fixed or variable annuities. The invention also relates to data processing and administrative systems used to administer withdrawals from mutual funds, particularly systematic withdrawals from such funds.

BACKGROUND OF THE INVENTION

Annuities typically serve the useful function of providing economic protection against the risk of longevity, in that an annuitant has the option of electing a life-contingent retirement income, thereby transferring the risk of outliving one's accumulated assets to an insurer.

A number of different kinds of annuities are available to meet the diverse needs of different individuals. These include deferred annuities and immediate annuities. In a deferred annuity, an individual is typically still in the "accumulation phase" of the annuity, amassing assets intended to sustain him or her during retirement years, when an earned wage from performing work is absent. In an immediate annuity, a lump sum of money is applied to purchase a series of retirement income benefit payments, with the first payment typically being made about one month after purchase, with subsequent benefit payments arriving each month thereafter.

The length of the term of the retirement income benefit payments is determined by the annuity benefit option elected by the annuitant. One type of annuity benefit option can provide lifetime income for the annuitant, regardless of how long he or she survives. Another type provides a similar benefit, but covers two lives, typically the annuitant and spouse.

Various types of additional guarantees can be attached to these life-contingent annuity benefit options. These include an option that guarantees the insurer will make at least a minimum number of monthly payments, typically 120 or 240. Another type of option guarantees that the insurer will pay out in benefits at least as much value as was applied to purchase the annuity. Increasing the guarantees typically has the effect of reducing the amount of the annuity benefit payments.

Non-life-contingent annuity benefit options are also available. For example, an annuity benefit that makes monthly payments for a specified period of time, such as thirty years, and then terminates is available.

Another distinction of the type of annuities available is whether it is classified as a "fixed annuity" or a "variable annuity." In a fixed annuity, the insurer bears the investment risks during the accumulation phase. The insurer guarantees a rate of interest applicable to each annuity deposit. The guarantee applies for a specified period of time, often one year, and is then reset periodically, moving in an amount and a direction that correlates with fixed-income investment yields available to the insurer in the capital markets.

In a variable annuity, the annuity contract owner bears the investment risk during the accumulation phase of the annuity. The annuitant(s) bear(s) the investment risk during the distribution, or payout, phase of the variable annuity. The individual(s) (owner and/or annuitant, who can be the same person) controlling the variable annuity typically have a choice of funds in which they can direct that annuity deposits be invested. These funds typically each represent one asset class, such as large capitalization U.S. common stocks, corporate bonds, money market instruments, or international stocks.

In a fixed annuity, the account value during the accumulation phase can only increase with time. In a variable annuity, the account value during the accumulation phase can either increase or decrease with time, depending on the performance of the fund(s) in which the annuity contract owner has directed that deposits be invested. The hope and expectation, but not guarantee, is that investments in the riskier asset classes typically associated with a variable annuity will provide long-term accumulated values superior to those of a fixed annuity. As annuities are geared toward providing retirement income, there typically is a long-term holding period. The table and graph of FIG. 1 illustrate annuity contract values as a function of time for both variable and fixed annuities. The fixed annuity contract of FIG. 1 illustratively earns 5% annually.

In a fixed annuity, the dollar amount of each annuity benefit payment during the distribution phase is known with certainty at the time the account value is applied to the purchase of an annuity benefit option. The act of purchasing an annuity benefit is often referred to as "annuitization." Fixed annuity benefit payments are typically level forever, such as $1,000 per month, or increase by a specified percentage, such as $1,000 per month, increasing by 3% each year. However, fixed annuity benefit payments are definitely determinable as to dollar amount at the point where the annuity contract owner elects the annuity benefit option from among his or her choices.

In a variable annuity, the dollar amount of each annuity benefit payment during the distribution phase is not known with certainty at the time the account value is applied to the purchase of an annuity benefit option. Rather, the annuitant(s) typically receive(s) the value of a specified number of annuity units each month. For example, if the annuitant is entitled to the value of 500 annuity units per month and the annuity unit value on the valuation date that determines the annuitant's benefit is $2.00, the annuitant receives an annuity benefit payment of $1,000 that month. If, on the next succeeding valuation date that determines the annuitant's benefit payment the annuity unit value is $2.05, the annuitant receives an annuity benefit payment of $1,025 that month. If the annuity unit value on the subsequent valuation date is $1.95, the annuitant receives $975 that month.

In contrast to fixed annuity benefit payments, variable annuity benefit payments are not definitely determinable as to dollar amount at the point where the annuity contract owner elects the annuity benefit option from among his or her choices. Variable annuity benefit payments are definitely determinable at the time of the annuity option election as to the number of annuity units that, when applied to unit value, will determine the amount of the benefit payment on each future payment date.

For variable annuities, "accumulation units" are the measure of value during the accumulation phase. Each specific fund or "subaccount", such as a domestic common stock fund, has an accumulation unit value that increases daily by realized and unrealized capital appreciation, dividends, and interest, and that decreases each day by realized and unrealized capital losses, taxes, and fees. The worth of a variable annuity contract owner's account is the number of accumulation units owned in each fund multiplied by the accumulation unit value of each fund as of the most recent valuation date (typically daily).

For variable annuities, "annuity units" are the measure of value during the distribution phase. "Annuity units" work very much like accumulation units, with one exception. Annuity units have built into them an "assumed interest rate (AIR)"—such as 3%, 4%, or 5%—at which a fund is assumed to grow annually in value. Thus, if a fund with a 5% AIR actually grew at 5% during a year, the annuity unit value for that fund would remain unchanged. To the extent the fund performance exceeds 5% AIR, annuity unit value increases. To the extent fund performance falls short of 5% AIR, annuity unit value decreases. Since the monthly benefit payment to the annuitant is the number of annuity units payable times the annuity unit value, fund performance in excess of the AIR causes the monthly annuity benefit payments to increase. Fund performance less than the AIR causes the monthly annuity benefit payments to decrease.

The table and graph of FIG. 2 illustrate the growth of accumulation unit value and annuity unit value, assuming a 9% gross investment return and a 5% AIR in the annuity unit value, for 15 contract years.

Variable annuity benefit options of sufficiently long duration have historically provided an inflation hedge to retirees superior to that available under fixed annuities.

While annuitization guarantees lifetime income, the contract holder loses liquidity (and, depending on the type of annuity, some or all of the death benefit implied by full liquidity). During the accumulation phase, the contract holder has full access to the account value. After annuitization, the contract holder cannot withdraw account value in excess of that provided in monthly payments, and the death benefit available is either zero or limited in some way (e.g. paid only as a continuation of payments during a predefined period). Because of this loss of liquidity and reduced (or non-existent) death benefit, many contract holders wanting periodic income choose not to annuitize. Instead, they make "systematic withdrawals" from their annuity while maintaining it in its active, or accumulation, phase.

Systematic withdrawal programs from active, unannuitized deferred annuity contracts are an alternative mechanism (i.e., an alternative to annuitization) for distributing retirement income to contract holders. For purposes of this specification, the term "systematic withdrawal program" means any program characterized by periodic payments (which may or may not be predefined as to method of determining the amount of each payment) where such payments are made from an investment account (which is referred to here as an "account value"). While the term "systematic withdrawal program" may have been, or may be, used to describe pre-existing or future programs in other contexts within the financial services industry, it is not the intent of the inventors to be limited in any way by such uses.

While systematic withdrawal programs provide full liquidity, that liquidity requires some tradeoffs. For example, if withdrawals are set at a specified dollar level, then these distributions can fully deplete the account value. In other words, the contract holder can outlive the retirement income provided by this method of distribution. Alternatively, if withdrawals are set as a percent of account value, then the period of distribution may be extended indefinitely, but a meaningful level of monthly retirement income may not be achieved. For example, if the percentage chosen is too high, the bulk of the account value will be distributed in the early years, leaving a much smaller account value base against which the same percentage will be applied, resulting in inconsequential monthly retirement income payments. Systematic withdrawal programs may also be applied to mutual funds, and other similar investment vehicles, which aside from differences in taxation and asset charges, are very similar to the accumulation phase of variable annuities.

SUMMARY OF THE INVENTION

One aspect of the present invention relates to distributions associated with withdrawal programs, including systematic withdrawal programs. More specifically, this aspect of the invention provides a method for administering a systematic withdrawal program in which the distribution program calls for a percentage withdrawal, the dollar amount of which is allowed to vary as the account value varies due to withdrawals, fees and expenses, and appreciation.

One aspect of the present invention provides an income benefit program that is superior to annuitization and systematic withdrawal programs (whether from deferred annuities, mutual funds, or any other similar investment program) by joining features of these two programs seamlessly so as to provide lifetime income benefit programs which maintain liquidity for the contract holder for as many years as the contract holder chooses. Upon commencement of the program, the contract holder selects a "liquidity period", defined as the number of years during which full liquidity will be maintained. During the liquidity period, an account value will be maintained. This account value will be credited with investment performance and debited with income and other payments.

For example, a contract holder, age 65, may select a liquidity period of 20 years. Using an assumed interest rate (AIR) and other factors, an initial payment will be determined. The amount of this payment will change from period to period based on the same formula used in determining payment changes under a typical variable immediate annuity, or annuitization under a variable deferred annuity. At the end of the liquidity period, if the contract holder wants payments to continue on this basis with a lifetime income guarantee, then liquidity is given up and the account value is no longer available as a death benefit. The exchange of account value liquidity for a lifetime income guarantee may be optional at or before the end of the liquidity period. The liquidity period may be changed at any time, or the contract holder may also continue the program on some other basis, or may elect to surrender the contract for its account value. For mutual find programs, the assets remaining in the mutual fund at the end of the liquidity period may, at the owner's option, be transferred to an immediate variable annuity to complete the program.

This aspect of the invention provides an account value that converts at the end of the liquidity period to a lifetime income benefit. The form of lifetime income benefit is assumed here to be a life annuity, but other forms of annuities might also be made available (for example, a "life with 10 year certain" annuity). Essentially, the value remaining in the account at the end of the liquidity period is used to purchase a life annuity (of whatever form) that continues payments for the life of the annuitant. The program blends payments both before and after the liquidity period in a seamless way. In the case where the amount of each payment is guaranteed, this guarantee applies both during and following the liquidity period. In the case where each payment is variable and is directly related to investment performance, the method for determining the amount of each payment, both during and following the liquidity period, is the same method as that normally used to determine variable annuity payments. This invention involves a unique administrative system that, among other things, customizes the liquidity period and the level of withdrawal to the particular owner.

This aspect of the present invention differs in several ways from variable annuitizations that allow commutation of future payments, and which therefore provide some degree of "liquidity". First, this program can apply to the accumulation period of the deferred annuity and, thus, would not require actual annuitization. Second, commutation of future payments typically requires demonstration of good health. Third, commutation may provide for less surrender value than the present invention provides, due to additional loads or charges applied at the time of commutation. Fourth, during its liquidity period, the present invention utilizes a "retrospective," as opposed to a "prospective," approach in determining contract value while commutation programs utilize a prospective approach. Under a retrospective approach, an account value is maintained by crediting the account value with investment performance and debiting the account value with income payments. Under a prospective approach, an account value is not maintained. Instead, the insurance company holds a reserve equal to the present value of future benefits.

Since, in at least certain embodiments of the present invention, initial and subsequent payments are higher with shorter liquidity periods, contract holders may decide for themselves the appropriate length of the liquidity period. Some may elect very short periods, such as five years. Others may elect very long periods, in effect maintaining complete access to their account values for what will likely be the entirety of their lives. Even in the latter instance, contract holders enjoy advantages over conventional systematic withdrawal programs. In particular, the initial payment anticipates returning some portion of principal over the contract holder's lifetime (the remaining portion being returned at death), while still guaranteeing that payments will be made regardless of how long the contract holder lives. Changes in payments from period to period are governed by the same formula as is used for life annuities and resulting payments are guaranteed for life.

Certain embodiments of the present invention provide a data processing method and apparatus for the determination and administration of income benefit payments that derive from the seamless combination of systematic withdrawals and a life annuity, as indicated above, and as will be described more fully below.

In one particular embodiment, the invention provides a computerized method for administering a benefit plan having a feature that provides systematic withdrawals during a liquidity period and a subsequent stream of annuity payments to be paid to the owner under the plan if the annuitant is living when the systematic payments cease. This method includes the step of storing data relating to the benefit plan, including data relating to at least one of an account value, an assumed investment rate, systematic and annuity payments, the liquidity period, an annuity period, and an annuity payout option. Then, during the liquidity period, the method includes the steps of determining a special annuity factor, determining an amount of an initial payment, and paying said amount to the owner, periodically determining the account value, periodically determining an amount of a current payment, monitoring the account value for unscheduled payments made under the contract and making corresponding adjustments to future payments, and periodically paying the current payment to the owner. The method further includes the step of determining the account value to be annuitized at the end of the liquidity period. Then, during the annuity period, the method includes the steps of determining an amount of an initial annuity payment, and paying said amount to the owner, periodically determining an amount of a current annuity payment, and periodically paying the current annuity payment to the owner.

In this method, the step of determining the special annuity factor during the liquidity period includes calculating the special annuity factor using the following formula:

$$\text{Special Annuity Factor} = \left[\sum_{t=0}^{n-1} v^t\right] + \left[v^n \times \sum_{s=0}^{\omega} v^s {}_s p_{x+n}\right](1+L)$$

Where:
  $v=1/(1+\text{AIR})$
  AIR=assumed investment rate for variable annuities or guaranteed investment rate for fixed annuities
  n=number of years in the liquidity period
  $\Sigma v^t$=present value, discounting for interest only, of $1 paid annually from t=0 to t=n−1
  $v^n$=present value, discounting for interest only, of $1 paid at t=n
  $\Sigma v^s x_s p_{x+n}$=present value, discounting for interest and mortality, of $1 paid annually from s=0 to the end of the mortality table
  L=expense load (positive or negative).

The initial payment is calculated at issue using the following formula:

$\text{Payment}_o=\text{Net Account Value}_o/\text{Special Annuity Factor}$

Where:
  $\text{Payment}_o$=initial payment
  Net Account Value$_o$=initial account value, net of any initial charge for benefit guarantees
  Special Annuity Factor=special annuity factor calculated at issue.

Payments made subsequent to the initial payment are determined by the following formula:

$\text{Payment}_{t+1}=\text{Payment}_t \times [(1+i)/(1+\text{AIR})]$

Where:
  $\text{Payment}_{t+1}$=payment made at time t+1
  $\text{Payment}_t$=payment made at time t
  i=net fund performance or interest credited during period t to t+1, net of any contract charges
  AIR=assumed investment rate for variable annuities or guaranteed interest rate for fixed annuities.

The account value during the liquidity period is determined by the following formula:

$\text{Account Value}_{t+1}=(\text{Account Value}_t-\text{Payment}_t)\times(1+i)$ Where:
  $\text{Payment}_t$=payment made at time t
  $\text{Account Value}_{t+1}$=account value at time t+1
  $\text{Account Value}_t$=account value at time t i=net fund performance or interest credited during period t to t+1, net of any contract charges.

The step of making adjustments to future payments to account for unscheduled payments during the liquidity period in the above method includes the steps of re-determining the account value as of the time the next systematic payment is due, and determining the next systematic payment as if it was an initial payment based on the re-determined account value and the time remaining in the liquidity period.

In the embodiment described above, the initial annuity payment is calculated using the following formula:

$$\text{Annuity Payment}_n = \text{Account Value}_n / AF_n$$

Where:
Annuity Payment$_n$=initial annuity payment made at time n
Account Value$_n$=account value at time n
$AF_n$=attained age annuity factor at time n.

An alternative, but equivalent, manner of calculating the initial annuity payment uses the following formula:

$$\text{Annuity Payment}_n = \text{Payment}_{t-1} \times [(1+i)/(1+AIR)]$$

Where:
Annuity Payment$_n$=initial annuity payment made at time n
Payment$_{n-1}$=final payment made during the liquidity period
i=net fund performance or interest credited during period n−1 to n, minus any contract charges
AIR=assumed investment rate for variable annuities or guaranteed interest rate for fixed annuities.

The equivalence of this method with the alternative is demonstrative of a "seamless" transition from systematic withdrawals to life annuity payments.

Annuity payments made subsequent to the initial annuity payment are determined by the following formula:

$$\text{Annuity Payment}_{t+1} = \text{Annuity Payment}_t \times [(1+i)/(1+AIR)]$$

Where:
Annuity Payment$_{t+1}$=annuity payment paid at time t+1
Annuity Payment$_t$=annuity payment paid at time t
i=net fund performance or interest credited during period t to t+1, minus any contract charges
AIR=assumed investment rate for variable annuities or guaranteed interest rate for fixed annuities.

The above-described method may be used with either a fixed or variable annuity plan. The method may be used when the benefit plan following the liquidity period is a straight life annuity benefit plan, or a life annuity benefit plan having either a death benefit or a surrender benefit. In one embodiment, this annuity has a surrender benefit or death benefit dependent upon the present value of specified future benefits.

The subject method includes the step of determining a cost of providing the annuity at the end of the liquidity period. This embodiment may further include the step of deducting the cost from the account value at the time of annuitization.

One embodiment of the subject method includes the step of discounting the annuity payments in an amount which is related to the cost of annuitization. This embodiment may further comprise the step of deducting a charge from the systematic payments during the liquidity period to offset the cost of annuitization.

The invention described is intended primarily to apply to variable annuities, mutual funds and similar investment programs. Nonetheless, the invention can also be applied to fixed annuities.

Other goals, advantages and novel features of the present invention will become apparent from the following detailed description of the invention when considered in conjunction with the accompanying drawings.

BRIEF DESCRIPTION OF THE DRAWINGS

FIG. 9 shows a table illustrating the operation of a systematic withdrawal program, in accordance with one aspect of the present invention.

DETAILED DESCRIPTION OF THE INVENTION

The present invention contrasts with normal annuitization in two ways. First, the annuitization of the contract (or, in the case of a mutual fund, purchase of the annuity) is postponed until the end of the liquidity period (which may be the end of the mortality table, if so elected). Rather, a series of income benefit payments specified by the program is made from an account value. This means that, upon death of the contract owner during the liquidity period, the account value is paid to the beneficiary. This contrasts with distribution methods associated with true annuitizations, where the form of the annuity payout option chosen governs whether any residual value remains for a secondary annuitant or beneficiary. For example, under a variable annuity contract annuitized under a single life annuity option with no certain period or other refund option, the insurer's obligation to the annuitant ceases upon death. No further payments, "account value," or any other form of residual value flows to the beneficiary. Even if the annuitization option includes a period certain (for example, life with a 10-year period certain), and even though the death of the annuitant during the certain period does not prevent the balance of the certain period payments from being made, no "account value" is available as a death benefit and no further benefits are paid after the certain period has ended.

Second, because the annuitization of the contract (or mutual fund) is postponed, a lump sum or partial account value withdrawal capability still resides with the owner(s) during the liquidity period. Additionally, the contract holder may elect to withdraw less than the allowable withdrawal amount; payments under a variable annuity payout do not offer this flexibility.

Figure 1:
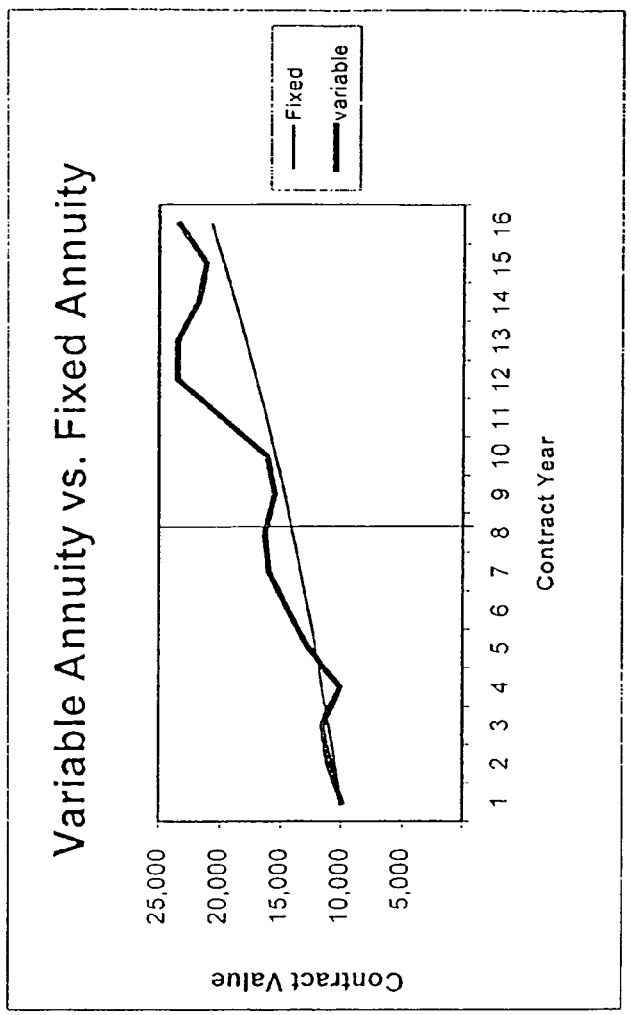
FIG. 1 shows a table and graph illustrating annuity contract values as a function of time for both variable and fixed annuities.
Figure 2:
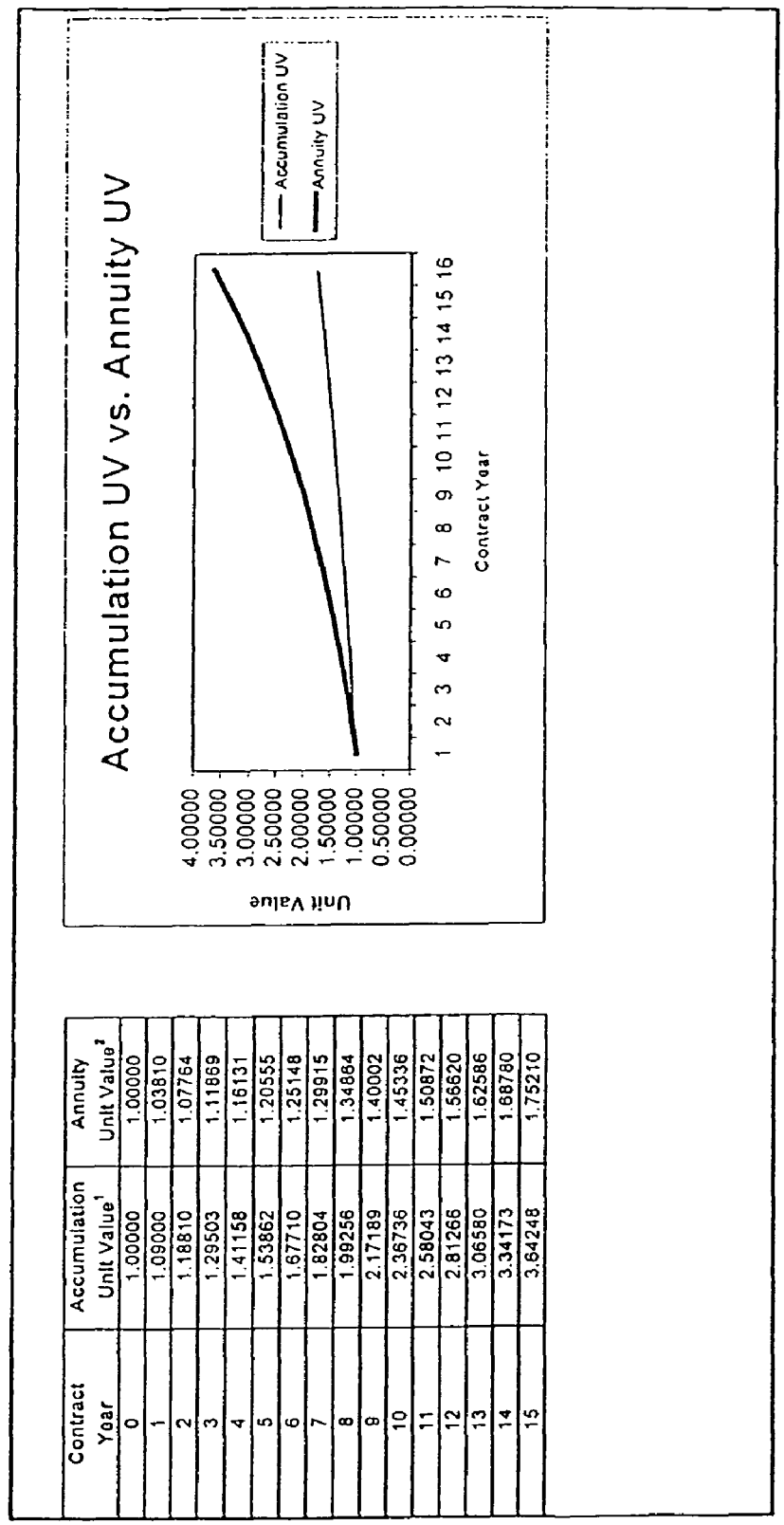
FIG. 2 shows a table and graph illustrating the growth of accumulation unit values and annuity unit values over a 15 year term.
Figure 3:
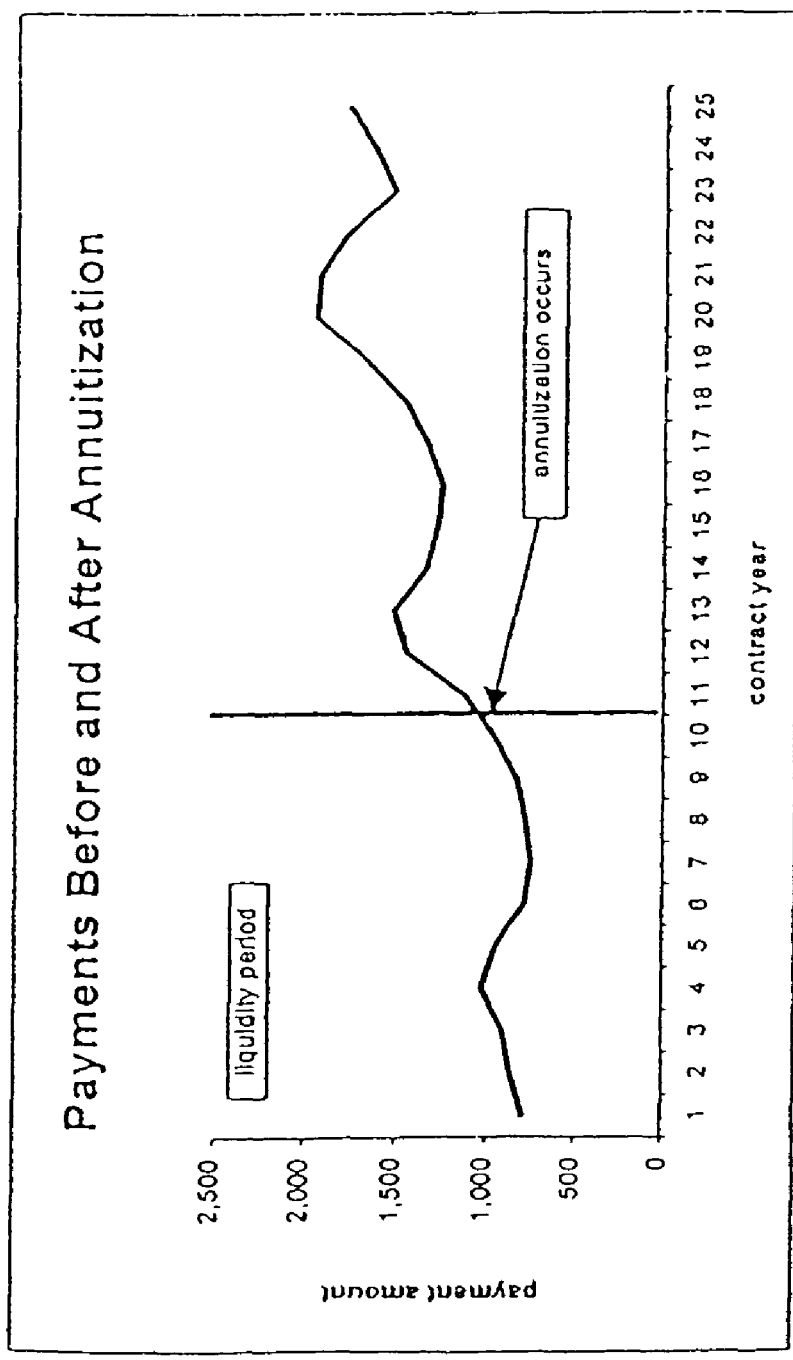
FIG. 3 shows a graph illustrating variable payments made during and after a liquidity period, in accordance with one aspect of the present invention.
Figure 4:
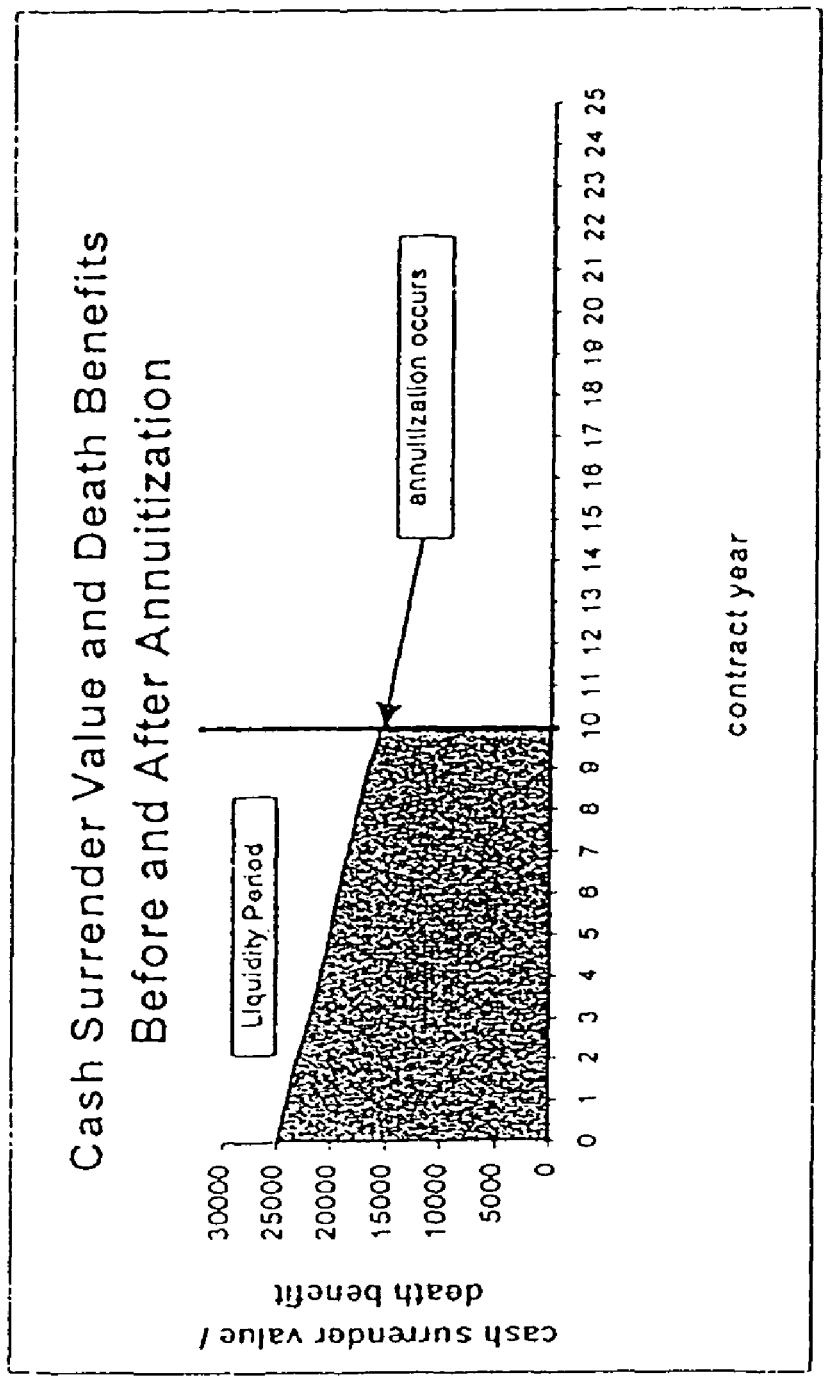
FIG. 4 shows a graph illustrating the cash surrender value and death benefits in affect before and after annuitization for a program of the type illustrated in FIG. 3.

Under this approach (which applies equally well to joint ownership as to single ownership), the contract holder chooses a period during which income benefit payments will be withdrawn from the account value and during which full account value liquidity is maintained. At the end of this liquidity period, the remaining account value is annuitized according to standard annuity payout options. The insurance company determines the amount of the initial benefit payment, based on the length of the liquidity period chosen, the age of the contract holder, and other factors. Using the assumed interest rate (AIR), the company calculates the initial withdrawal so that, if the AIR is realized in a given period, the benefit payment amount will not change. FIG. 3 illustrates variable payments made during and after the liquidity period in a program of this type. FIG. 4 illustrates the cash surrender value and death benefits before and after annuitization for a program of this type.

The amount of the initial benefit payment can be determined by a method that begins with calculating a special annuity factor equal to the present value (using the AIR) of an annual payment of $1.00 during the chosen liquidity period, plus the present value (again using the AIR) of annual payments of $1.00 after the end of the liquidity period, such payments made according to the desired annuity option. The initial payment is then calculated by dividing the available account value at the beginning of the program by the special annuity factor described above.

Subsequent benefit payments are adjusted up or down exactly as payments are adjusted under normal annuitization.

For example, assuming an n-year liquidity period and a life only annuity at the end of that period, the special annuity factor is calculated as follows:

$$\text{Special annuity factor} = \Sigma v^t + \Sigma v^t_{t-n} p_{x+n}$$

where:
$v = 1/(1+AIR)$
n=number of years in the liquidity period
$\Sigma v^t$=the present value of payments from t=0 to t=n−1
$\Sigma v^t_{t-n} p_{x+n}$=the present value of payments from t=n to the end of the mortality table, where each payment depends on the probability that the owner lives from duration n to duration t.

Under this method, the liquidity period can be extended to the end of the mortality table (for example, age 115); in such case, if the owner lives until that age, a life annuity is still guaranteed, but by that age the financial risk to the insurer is de minimis.

The contract holder may make additional deposits and may make withdrawals in excess of the designated withdrawal amount, provided the end of the liquidity period has not yet been reached. In such instances, the benefit payment program must be adjusted. Adjustments are made by increasing or decreasing the current payment amount by the same proportion as the amount of the new transaction (deposit or excess withdrawal) bears to the account value just prior to the transaction. For example, if the current account value is $50,000 and the current payment amount is $1,500, an additional deposit of $5,000 increases the account value by 10% and the payment amount is therefore increased by 10%. In the same example, an unscheduled payment of $5,000 (which is therefore an excess withdrawal of $5,000) reduces the account value by 10% and the current payment amount reduces by 10%. In the adjustments, the investment return for the period from the most recent scheduled payment to the date of the new transaction may be reflected in the adjustment.

This invention also encompasses the integration of this program with death benefit guarantees. For example, such death benefit guarantees may promise that the contract owner will have returned to him or her a specified percentage of either the initial deposit, the "high-water mark" account value as of any subsequent policy anniversary, deposits accumulated at a specified interest rate or rates, or other definitions of value, with prorata or other adjustments made for payment amounts received prior to death.

In addition to distribution methods associated with true annuitizations, distributions associated with withdrawal programs—including systematic withdrawal programs—from active (unannuitized) deferred annuity contracts are also encompassed by this invention.

For example, for a given attained age(s) and, where allowed, gender(s), an insurer may permit withdrawals from an active (unannuitized) deferred annuity contract. Under such a program, if these withdrawals do not exceed a predetermined percentage established by the insurer for a given withdrawal frequency, the insurer guarantees that withdrawals under this program will last for the period prescribed, including a lifetime period.

As a hypothetical example, if a male age 60 withdraws 4.4% of the initial account value each year, such withdrawals are guaranteed to last a lifetime. (Initial account value is that account value at the time a systematic withdrawal program, inclusive of this guaranteed minimum benefit payment option, commences.) There is an explicit increment to the asset charge for those customers who opt to purchase this benefit.

This distribution program contrasts with those shown earlier in two major ways. First, the variable annuity contract is never "annuitized." Rather, a series of partial withdrawals is made from an active (unannuitized) deferred variable annuity contract. This means that, upon death of the contract owner, the account value is paid to the beneficiary. This contrasts with distribution methods associated with true annuitizations, where the form of the annuity payout option chosen determines whether any residual value remains for a secondary annuitant or beneficiary. For example, under a variable annuity contract annuitized under a single life annuity option with no certain period or other refund option, the insurer's obligation to the annuitant ceases upon death. No further payments, "account value," or any other form of residual value flows to the beneficiary.

Second, because the variable annuity contract is never annuitized under this distribution program, a lump sum or partial account value withdrawal capability still resides with the variable deferred annuity contract owner(s). However, withdrawals in excess of the amounts stated by the insurer to keep the guaranteed payout program in place may alter or may terminate the program.

One variant of this distribution program calls for the percentage withdrawal allowed to be not just of the initial account value, but rather of the highest account value achieved on any policy anniversary following inception of the program, such account value necessarily recognizing all withdrawals and fees as well as appreciation.

For example, suppose a male age 60 may withdraw 4.4% of the initial account value each year under this program and be guaranteed a lifetime income of that amount. Suppose the initial account value at inception of this program is $100,000. The contract owner withdraws $4,400, the maximum permitted. Favorable fund performance causes the account value to increase from $100,000−$4,400=$95,600 to $110,000 as of the contract owner's next policy anniversary when he has attained age 61. The account value against which the 4.4% withdrawal applies is then re-established as the "high-water mark" account value on any policy anniversary. Thus, he may now withdraw up to 4.4% of $110,000, or $4,840, each year and have the lifetime income guarantee program remain in place. If the account value subsequently decreases at all—even to zero—the $4,840 is guaranteed to be paid for life.

The table of FIG. 9 illustrates the operation of this aspect of the invention. In the illustration of FIG. 9, the initial account value is $100,000, the withdrawal guarantee is 7.5% of the highest account value attained, the investment return is assumed to be as illustrated, and the term is 15 years.

In addition to guaranteed income for specified periods including lifetime periods under systematic withdrawal programs, this invention also encompasses the integration of such income guarantees with death benefit guarantees. For example, such death benefit guarantees may promise that the contract owner will have returned to him or her a specified percentage (e.g., 0%-100%, inclusive) of either the initial account value or the "high-water mark" account value as of any subsequent policy anniversary.

Under this approach, the initial withdrawal amount is adjusted in the same way variable annuity benefit payments subsequent to the initial payment are adjusted (see above), substituting "withdrawal" for "benefit" in the formulas. Such adjustment occurs during the liquidity period (chosen by the contract holder at the beginning of the program) and continues on into the life annuity period to adjust the variable payments under that phase of the program also.

Figure 5:
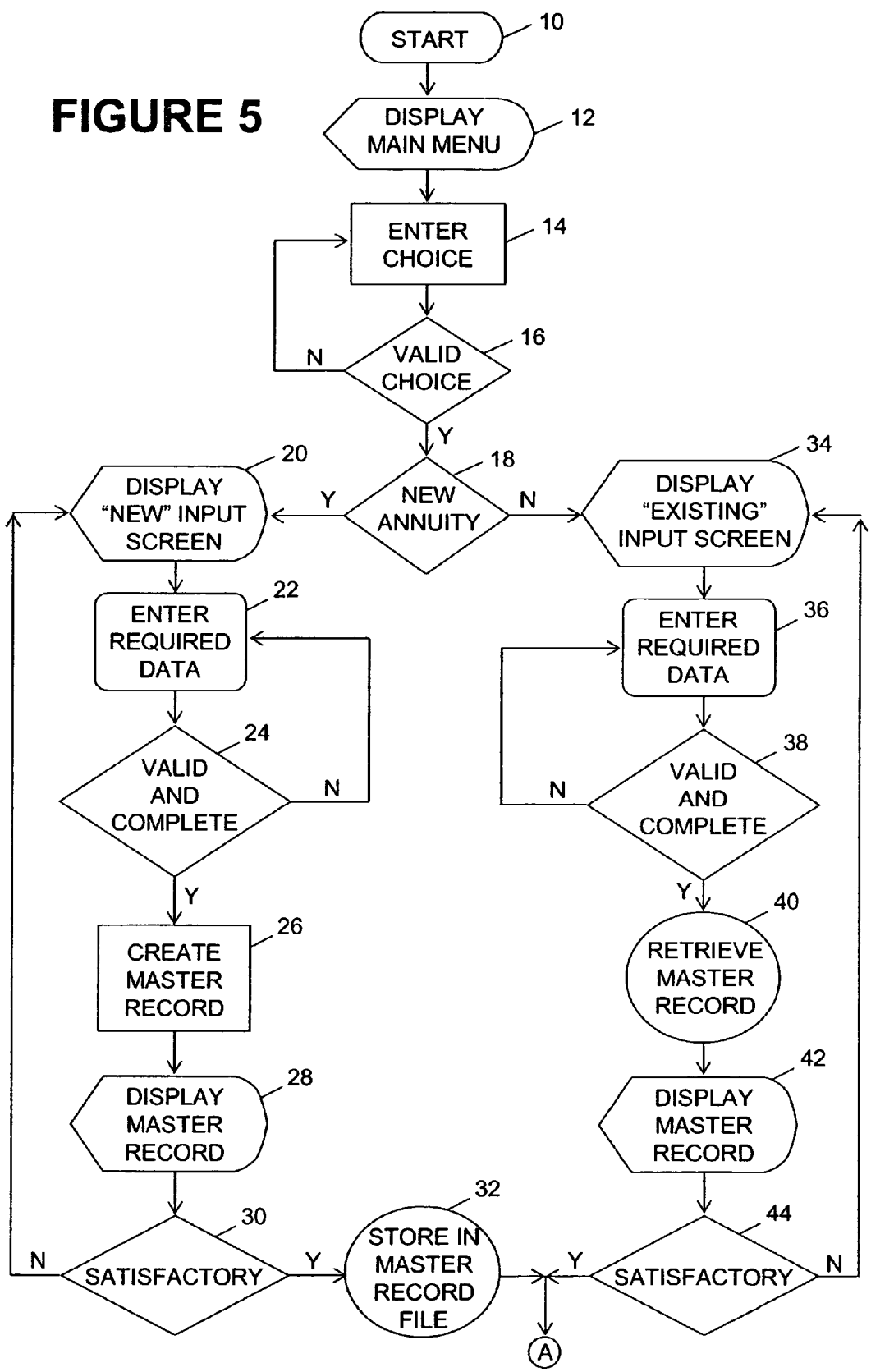
FIG. 5 shows a flow chart illustrating the data collection and entry steps of the computerized method of the present invention.

Since the first adjustments are made during the liquidity period, the deferred annuity account value (or mutual fund account value) must be maintained as usual for deferred annuities (or mutual funds), with special adaptation for additional deposits and for withdrawals in excess of the calculated withdrawal amount. Assuming no additional deposits and no excess withdrawals, the administration of the account value proceeds as follows:

$$\text{Account Value}_{t+1} = (\text{Account Value}_t - \text{Withdrawal}_t) \times (1+i)$$

where:
Account Value$_{t+1}$=Account value at time t+1
Account Value$_t$=Account value at time t
Withdrawal$_t$=dollar amount of variable withdrawal benefit at time t
i=actual fund performance during period t to t+1 (as a Description of the Flow Charts FIG. 5 is a flow chart which illustrates a portion of a computerized method of practicing the present invention. More particularly, FIG. 5 is an illustrative embodiment of the steps which are taken to collect data which is used in the remainder of the process, as described in more detail below. For a new annuity, the data collected through the individual steps illustrated in FIG. 5 may be entered manually at a computer terminal or equivalent input device, or electronically, or in any other manner which is customary at present or in the future. For an existing annuity, the data will generally be retrieved from an existing contract master record, or other file.

The process may be initiated (block 10) either manually at a work station, or automatically in a batch cycle. In either case, a main menu is displayed (block 12) or provided, offering a number of possible operations. A choice may be entered by an operator or emulator (block 14). The choice may be validated as indicated in FIG. 5 (block 16).

After a valid choice has been selected, the system determines whether the subject annuity is a new annuity or an existing annuity (block 18). For a new annuity, the process proceeds to display a new annuity input screen (block 20). This screen contains entry fields for items such as: information regarding the annuitant, owner and/or beneficiary; information regarding type of annuity chosen, including relevant dates and amounts; information on interest and mortality guarantees to be used in the subsequent calculations; and other related information. This data is entered (block 22) and checked for validity and completeness (block 24). If the data is valid and complete, a master record is created (block 26). The fields of the master record are populated with the data entered in step 22. The new master record is then displayed (block 28) for visual checking by an operator. If the data is deemed to be satisfactory (block 30), the master record is stored in a master record file (block 32). If the data is not satisfactory, the process repeats as indicated in FIG. 5.

Referring again to step 18, if the system determines that an existing annuity is to be dealt with, processing proceeds to display the existing annuity input screen (block 34). This screen contains entry fields for items such as: contract number; annuitant identification; and other items associated with the existing annuity contract. New data is entered (block 36) via the existing annuity input screen, and such new data is checked to determine validity and completeness (block 38). The master record associated with the existing annuity contract is retrieved (block 40) and displayed (block 42) for viewing by an operator. If and when the master record, as updated by the newly inputted data, is satisfactory, processing proceeds as indicated in FIG. 5.

Figure 6:
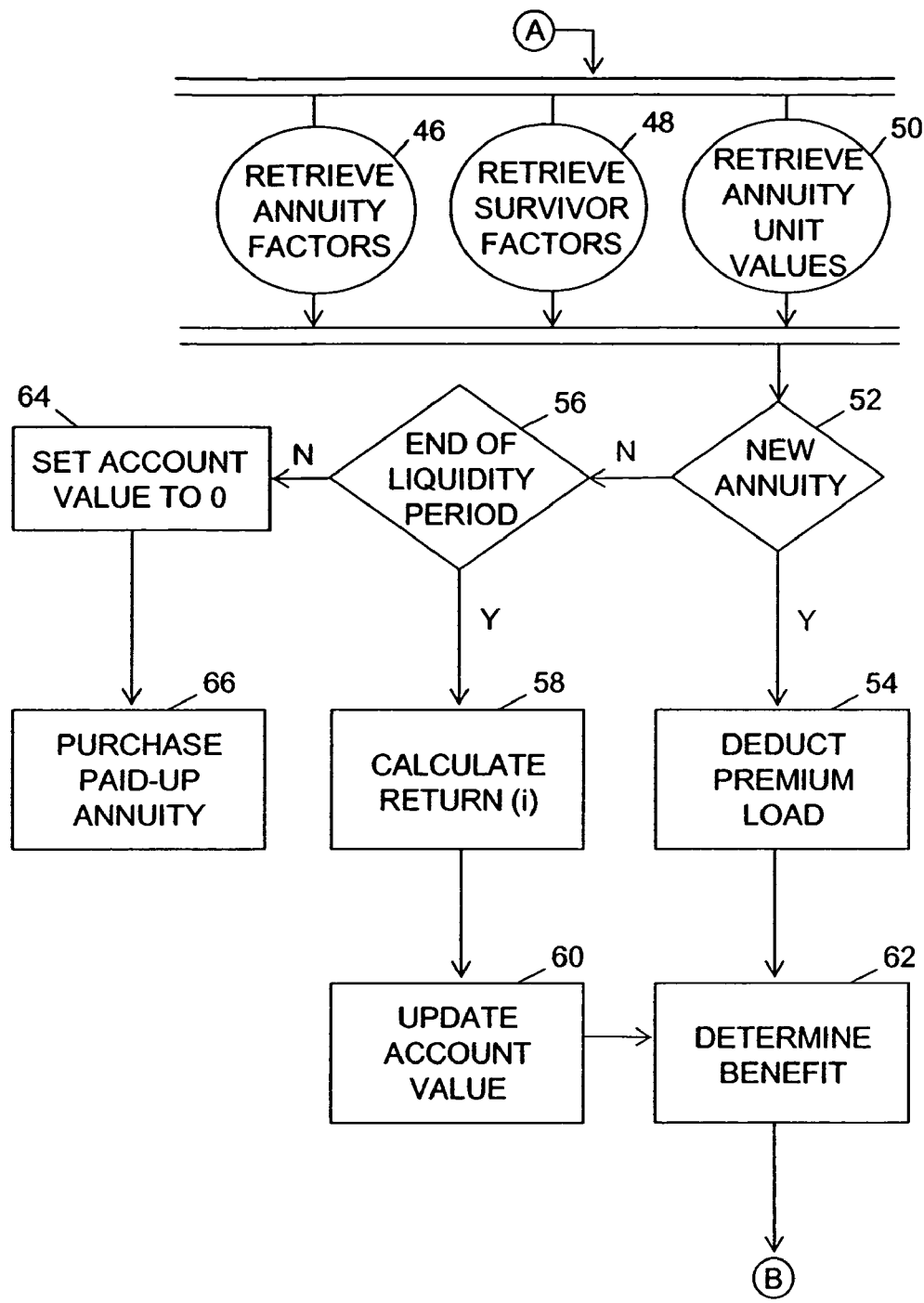
FIG. 6 shows a flow chart illustrating a portion of a computerized method which utilizes a retrospective approach to annuity benefit calculation.

FIG. 6 illustrates the next step in the overall process of the present invention. That step is calculation of an annuity benefit using information from the master record, as created or updated in the process of FIG. 5 and other retrieved data. More particularly, the flow charts of FIGS. 6 and 7 illustrate one embodiment of a computer-based process for calculating an annuity benefit in accordance with a retrospective approach to benefit calculation.

The first step in the flow chart of FIG. 6 is to retrieve additional data relating to annuity factors (block 46), survivor factors (block 48) and annuity unit values (block 50). These data are typically stored in files used for other purposes, although duplicate or dedicated purpose files may be created to hold such information for use in the calculation process. The process of FIG. 6 then checks to determine whether the particular calculation at hand involves a new or existing annuity (block 52). If the calculation involves a new annuity, processing proceeds by deducting the premium load (if any) from the amount of money available for purchasing the annuity (block 54). For an existing annuity, the process checks for the end of the liquidity period (block 56). If the liquidity period has come to an end, the account value is set to 0 (block 64) and a paid up immediate annuity is purchased (block 66). If the liquidity period continues, the system calculates the investment return (i) for the recent period using annuity unit values (block 58). The results of step 58 are then used to update the account value (block 60).

Following step 54, for new annuities, or step 60, in the case of existing annuities, the benefit is determined. This calculation uses the net money available for purchasing the annuity, the appropriate annuity factor for the age, sex and type of annuity, and the appropriate annuity unit value to determine the benefit. The benefit may also be adjusted according to other terms of the contract (e.g., multiplied by 0.8, or other factor) (block 62).

Figure 7:
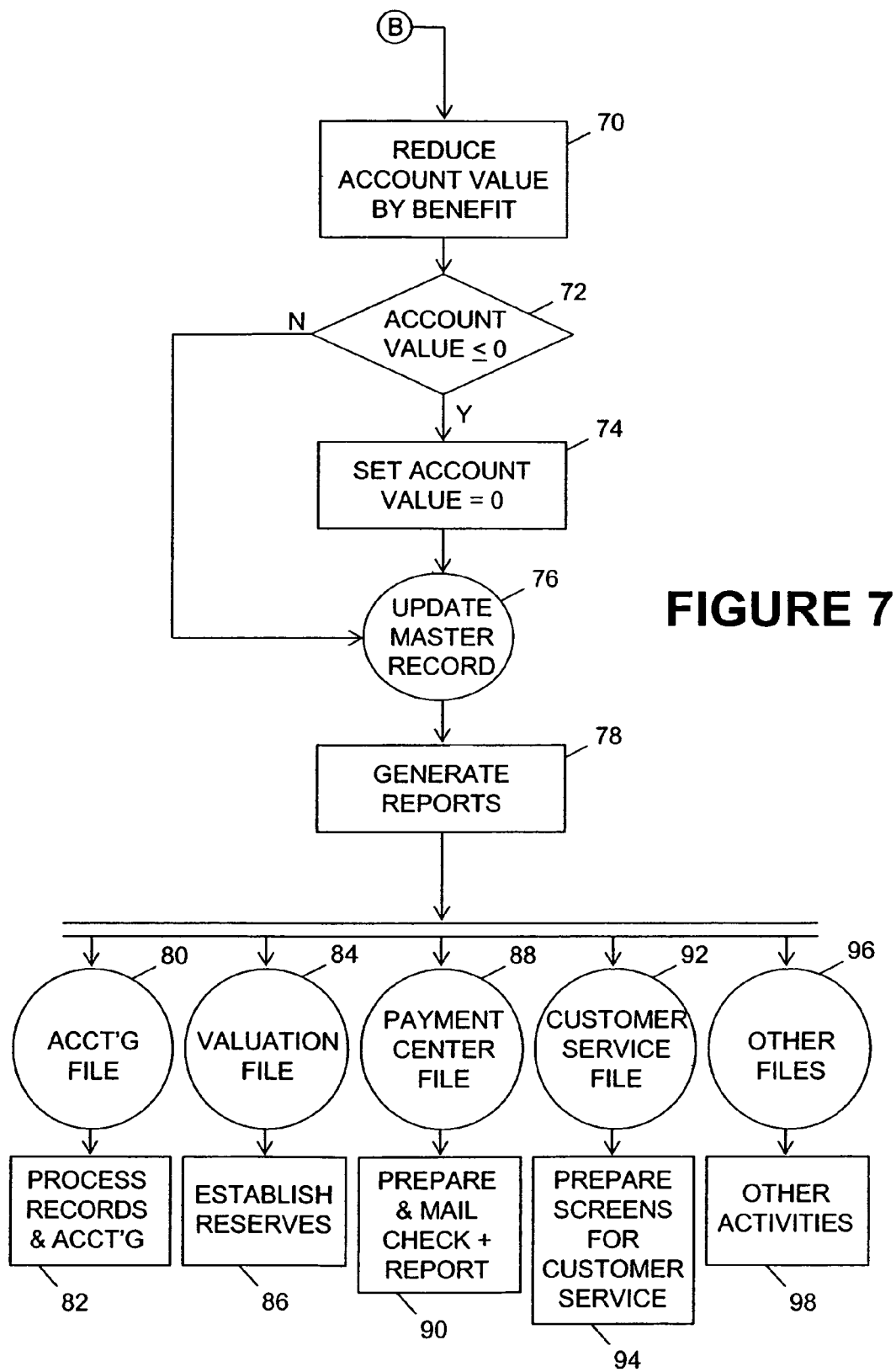
FIG. 7 shows a flow chart which is a continuation of the flow chart of FIG. 6.

Processing in accordance with the retrospective approach continues as illustrated by the flow chart of FIG. 7. Generally, the flow chart of FIG. 7 illustrates the steps of using the benefit amount determined in the process of FIG. 6 to update files and make adjustments needed for the benefit calculations to be performed on the next benefit payment date. Also illustrated in FIG. 7 are steps relating to the generation of reports and updates for the benefit of both the annuity payer and the annuitant.

With reference to FIG. 7, the benefit determined in step 62 is used to reduce the Account Value by the amount of the benefit (block 70). The system then checks to see if the Account Value is less than zero (block 72). If so, the Account Value is then set to equal zero (block 74). In either event, the system then proceeds to update the master record (block 76). All appropriate data and information entered or affected by the processing to this point are captured on the master record. This data would include such items as the amount of the benefit determined in step 62, the new account value or remaining units, payment date(s) of benefit(s), the next benefit due date, and similar information. Following the updating of the master record (and any other related files), the system generates reports (block 78). Reports may be generated for internal use, as well as for the annuitant. Representative usages are illustrated in FIG. 7. These include: accounting file (block 80) for use in preparing process and accounting records (block 82); a valuation file (block 84) for use in establishing reserves (block 86); a payment center file (block 88) for use in preparing benefit checks and reports to annuitants (block 90); a customer service file (block 92) for use in preparing screens for the use of customer service personnel in responding to inquiries from annuitants and related entities; and other files (block 96) for use in any other activities (block 98) which might be useful to the annuity payer or annuitant.

Figure 8:
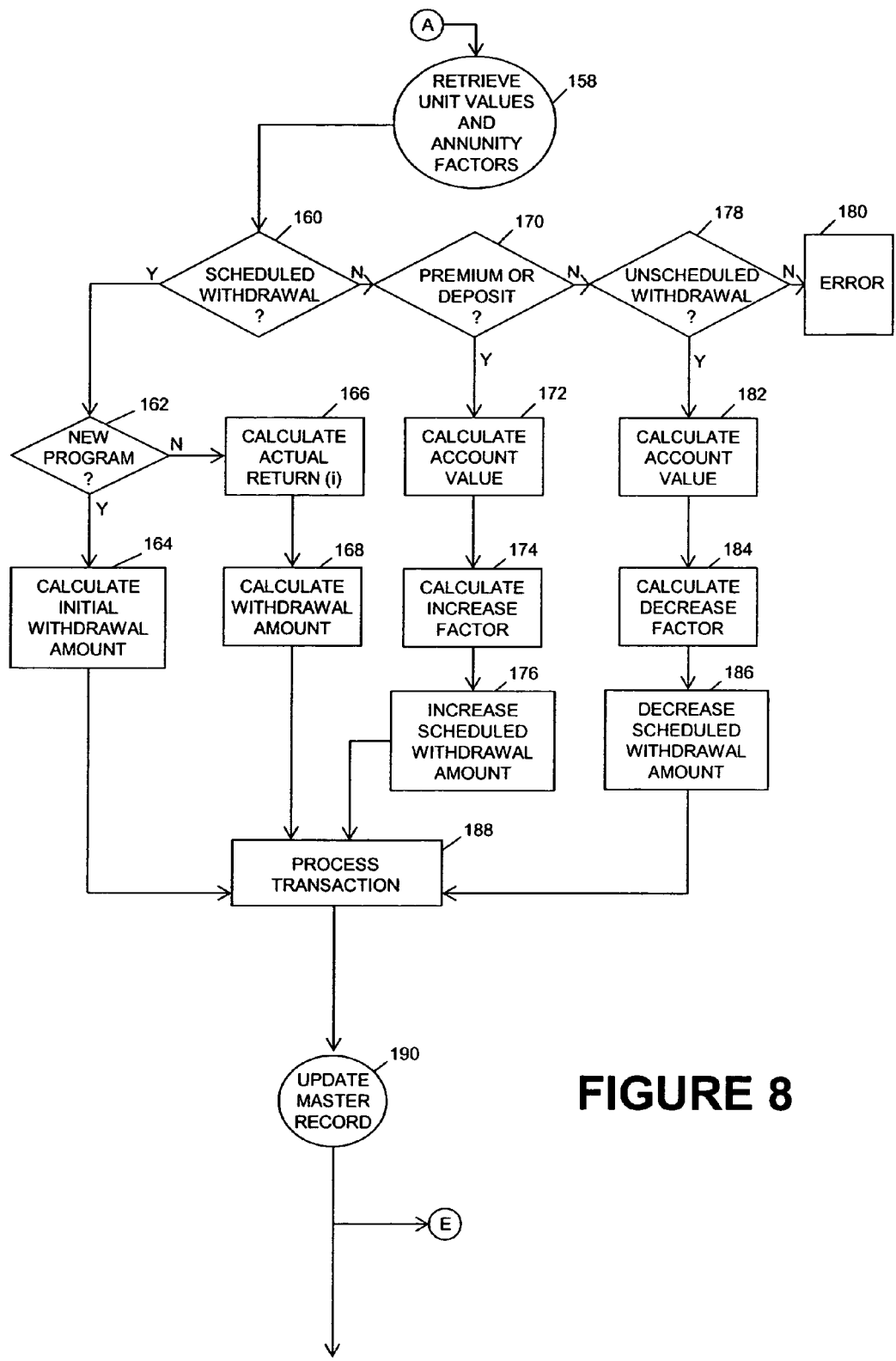
FIG. 8 shows a flow chart illustrating a computerized method which provides for scheduled and unscheduled withdrawals in an investment program, in accordance with one aspect of the present invention.

FIG. 8 illustrates an alternative embodiment of an annuity-based retirement program constructed in accordance with the present invention. As indicated by the continuation letter "A" at the top of the flow chart of FIG. 8, this embodiment shares the data collection steps illustrated in FIG. 5 in common with the preceding embodiments. Similar information regarding the annuitant and account is collected in accordance with the steps described in connection with FIG. 5. Additional information specific to the present embodiment, such as length of the liquidity period, is also entered in accordance with the steps described in connection with FIG. 5.

With reference to FIG. 8, the process continues by retrieving additional data (block 158), such as annuity unit values, annuity factors, and survivor factors. These values are typically stored in files which may be used for other purposes, as well.

Following the data retrieval step, the system determines whether a particular event is a scheduled withdrawal (block 160). If yes, the system then checks to determine if the withdrawal program is a new program (block 162). If yes, the system proceeds to calculate the initial withdrawal amount (block 164) based upon the data inputted for the new account. If the account is not a new program, the system calculates the actual net investment return, i, (block 166). The system then calculates the new withdrawal amount (block 168), using the actual net investment return and the AIR.

If the subject event is not a scheduled withdrawal, the system checks to determine whether the event is a premium payment or deposit (i.e., is a negative withdrawal) (block 170). If yes, the system calculates the current account value (block 172), calculates the increase factor (block 174) using the formulas described below, and increases the scheduled withdrawal amounts to be used in future calculations (block 176).

If the subject event is not a scheduled withdrawal and is not a premium payment or deposit, the system checks to confirm that it is an unscheduled withdrawal (block 178). If the system indicates that this is not the case, an error message is produced (block 180) and the process halts. If the system confirms that the event is an unscheduled withdrawal, processing proceeds with calculation of the current account value (block 182), calculation of the decrease factor (block 184), as described previously, and decrease of the scheduled withdrawal amount to be used in the future (block 186).

As indicated in the flow chart of FIG. 8, after completion of the appropriate steps described above, the system processes the transaction amount (i.e., the amount of the scheduled withdrawal, premium payment, deposit, or unscheduled withdrawal) (block 188). The master record is then updated (block 190). As indicated by the connecting letter "E", the system then updates the files and generates reports in the same manner as described in connection with the previously discussed embodiments of the invention.

From the preceding description of the preferred embodiments, it is evident that the objectives of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A computerized method for administering a benefit plan using a computer having a storage element, said plan having a feature that provides a stream of systematic withdrawal payments during a liquidity period and annuity payments under an annuity payout option to be paid to an owner under the plan if the owner is living when the systematic withdrawal payments cease, and having an account value during the liquidity period which includes a first portion for funding payments during the liquidity period and a second portion for funding payments during an annuity period, comprising the steps of:

a) storing data relating to the benefit plan in the storage element, including data relating to at least one of the account value, an AIR, where AIR is one of an assumed investment rate and an interest rate, systematic withdrawal and annuity payments, the liquidity period, the annuity period, and the annuity payout option;

b) during the liquidity period, using the computer to periodically perform the steps of:

1. determining a single special annuity factor based on the AIR for the liquidity period and the AIR and mortality rate for the annuity period;

2. determining an amount of a payment using the special annuity factor and said first and second portions of the account value, and paying said amount to the owner;

3. determining the account value; and 4. monitoring the account value for unscheduled payments made under the benefit plan and making corresponding adjustments to future payments;

c) at the end of the liquidity period, determining the account value to be used to determine the initial annuity payment in the annuity period; and d) during the annuity period, using the computer to periodically perform the steps of:

1. determining an amount of an annuity payment; and 2. periodically paying the annuity payment to the owner.

2. The method of claim 1, wherein the special annuity factor is calculated using the following formula:

$$\text{Special Annuity Factor} = \left[\sum_{t=0}^{n-1} v^t\right] + \left[v^n \times \sum_{s=0}^{\omega} v^s {}_s p_{x+n}\right](1+L)$$

Where:
v=1/(1+AIR)
AIR=assumed investment rate for variable annuities or guaranteed interest rate for fixed annuities
n=number of years in the liquidity period
$\Sigma v^t$=present value, discounting for interest only, of $1 paid annually from t=0 to t=n−1
$v^n$=present value, discounting for interest only, of $1 paid at t=n
$\Sigma v^s\, {}_s p_{x+n}$=present value, discounting for interest and mortality, of $1 paid annually from s=0 to the end of the mortality table
L=expense load (positive or negative).

3. The method of claim 1, wherein an initial payment in the liquidity period is calculated at issue using the following formula:

Payment$_o$=Net Account Value$_o$/Special Annuity Factor$_o$

Where:
Payment$_o$=initial payment
Net Account Value$_o$=initial account value, net of any initial charge for benefit guarantees
Special Annuity Factor$_o$=special annuity factor calculated at issue.

4. The method of claim 3, wherein payments made subsequent to the initial payment are determined by the following formula:

Payment$_{t+1}$=Payment$_t$×[(1+$i$)/(1+AIR)]

Where:
Payment$_{t+1}$=payment made at time t+1
Payment$_t$=payment made at time t
i=net fund performance (or interest credited) during period t to t+1, net of any contract charges
AIR=assumed investment rate for variable annuities or guaranteed interest rate for fixed annuities.

5. The method of claim 1, wherein the account value during the liquidity period is determined by the following formula:

Account Value$_{t+1}$=(Account Value$_t$−Payment$_t$)×(1+$i$)

Where:
Payment$_t$=payment made at time t
Account Value$_{t+1}$=account value at time t+1
Account Value$_t$=account value at time t
i=net fund performance (or interest credited) during period t to t+1, net of any contract charges.

6. The method of claim 1, wherein the step of making adjustments to future payments due to an unscheduled payment comprises the steps of re-determining the account value as of the time the next systematic payment is due, and determining the next systematic payment as if it was an initial payment based on the re-determined account value and the time remaining in the liquidity period.

7. The method of claim 1, wherein an initial annuity payment is calculated using the following formula:

Annuity Payment$_n$=Account Value$_n$/AF$_n$

Where:
Annuity Payment$_n$=initial annuity payment made at time n
Account Value$_n$=account value at time n
AF$_n$=attained age annuity factor at time n.

8. The method of claim 1, wherein an initial annuity payment is calculated using the following formula:

Annuity Payment$_n$=Payment$_{n-1}$×[(1+$i$)/(1+AIR)]

Where:
Annuity Payment$_n$=initial annuity payment made at time n
Payment$_{n-1}$=final payment made during the liquidity period
i=net fund performance (or interest credited) during period n−1 to n, net of any contract charges
AIR=assumed investment rate for variable annuities or guaranteed interest rate for fixed annuities.

9. The method of claim 8, wherein annuity payments subsequent to the initial annuity payment are determined by the following formula:

Annuity Payment$_{t+1}$=Annuity Payment$_t$×[(1+$i$)/(1+AIR)]

Where:
Annuity Payment$_{t+1}$=annuity payment paid at time t+1
Annuity Payment$_t$=annuity payment paid at time t
i=net fund performance (or interest credited) during period t to t+1, net of any contract charges
AIR=assumed investment rate for variable annuities or guaranteed interest rate for fixed annuities.

10. The method of claim 1, wherein the benefit plan is a straight life annuity benefit plan.

11. The method of claim 1, wherein the benefit plan is a life annuity benefit plan having at least one of a death benefit and a surrender benefit.

12. The method of claim 11, wherein said surrender benefit or death benefit is dependent upon the present value of specified future benefits.

13. The method of claim 1, further comprising the step of determining, at the end of the liquidity period, a charge for providing the annuity.

14. The method of claim 13, further comprising the step of deducting the charge from the account value at the end of the liquidity period.

15. The method of claim 13, further comprising the step of reducing the annuity payments in an amount which is related to the charge.

16. The method of claim 13, further comprising the step of making a deduction from the systematic payments during the liquidity period to offset the charge.

17. The method of claim 3, wherein payments during the liquidity period made subsequent to the initial payment are determined by the following formula:

Payment$_t$=Net Account Value$_t$/Special Annuity Factor$_t$

Where:
Payment$_t$=subsequent payment
Net Account Value$_t$=Account Value, net of any charges, at time t
Special Annuity Factor$_t$=Special Annuity Factor calculated at time t.

* * * * *